(12) United States Patent
Tate

(10) Patent No.: US 7,807,928 B1
(45) Date of Patent: Oct. 5, 2010

(54) DECORATIVE RETRACTABLE CORD COVER

(76) Inventor: Theresa W. Tate, 13595 Inwood, Beaumont, TX (US) 77713

(*) Notice: Subject to any disclaimer, the term of this patent is extended or adjusted under 35 U.S.C. 154(b) by 174 days.

(21) Appl. No.: 12/291,214

(22) Filed: Nov. 7, 2008

(51) Int. Cl.
*H01B 7/00* (2006.01)
(52) U.S. Cl. .................... 174/110 R; 174/112
(58) Field of Classification Search .......... 174/110 R, 174/112
See application file for complete search history.

(56) References Cited

U.S. PATENT DOCUMENTS

| D296,322 S | 6/1988 | Collins |
|---|---|---|
| 5,130,496 A | 7/1992 | Jenkins |
| 5,800,762 A | 9/1998 | Bethel |
| 6,018,874 A | 2/2000 | Todd |
| D445,093 S | 7/2001 | Staskey |
| 6,740,818 B2 | 5/2004 | Clark |
| D509,802 S | 9/2005 | Davison |
| 2003/0098172 A1* | 5/2003 | Clark ............... 174/68.3 |
| 2005/0031821 A1* | 2/2005 | Clark ............... 428/40.1 |
| 2005/0109361 A1* | 5/2005 | Klug ............... 132/275 |

* cited by examiner

*Primary Examiner*—William H Mayo, III
(74) *Attorney, Agent, or Firm*—Montgomery Patent and Design; Robert C. Montgomery; Joseph T Yaksich

(57) ABSTRACT

A cylindrical textile cover for electrical cords with an embedded elastic material to coil a conventional cord and to keep said cord from tangling is herein disclosed. A power cord for a styling appliance, tool, computer or the like, is placed within the elasticized textile cover and secured at both ends leaving a minimal amount of electric cord exposed. Thus, as the user of the appliance needs more cord, one would pull on the cord forcing the cover to stretch out. The maximum length of the cover is limited by the total length of the cord. As the cord is relaxed, the cover retracts upon itself taking on a convenient compact form.

19 Claims, 3 Drawing Sheets

DECORATIVE RETRACTABLE CORD COVER

RELATED APPLICATIONS

The present invention was first described in Disclosure Document number 611,404 filed with the United States Patent and Trademark Office on Jan. 22, 2007. There are no previously filed or pending applications filed anywhere in the world.

FIELD OF THE INVENTION

A cylindrical textile cover for electrical cords with an embedded elastic material to coil a conventional cord and to keep said cord from tangling is herein disclosed.

BACKGROUND OF THE INVENTION

Personal hairstyles are as unique as one's personality. In the world of hair styling, there are literally thousands of styles from which to choose. The tools used to style hair include curling irons, flat irons and blow dryers. They add body and to create numerous styles in a quick manner with a minimum of fuss. In professional hair salons, beauticians often have numerous sizes and types of each styling tool. Thus, it is very easy for the cords of these appliances to become tangled, becoming a frustrating nuisance for the stylist as well as an eyesore. These same problems can also exist with computers, power tools, kitchen counter appliances and the like. Accordingly, there exists a need for a means by which one can quickly and easily organize, excess cable slack, but still be afforded an easy and aesthetically pleasing way to use the entire length of cable when needed. The development of the invention herein described fulfills this need.

It is prevalent for Americans to possess many different types of electrical devices. These devices have cords that frequently become tangled and create a cluttered appearance. This frustrates many homeowners and business owners such as salons. An invention such as the one described eliminates this frustration.

Several attempts have been made in the past to organize electrical cords. U.S. Pat. No. D 509,802 in the name of Davison discloses a novelty cord attachment possessing a football helmet on one end. Unfortunately, this design patent does not appear to be similar in appearance to the disclosed invention nor does it appear to be a cord cover that retracts to prevent tangling and clutter.

U.S. Pat. No. D 445,093 in the name of Staskey discloses a fixed cord cover with a decorative pattern and a method of use. Unfortunately, this design patent does not appear to disclose a cord cover that is retractable through the use of an elastic element and that attaches at both ends of the cord.

U.S. Pat. No. 6,740,818 in the name of Clark discloses a removable tubular cord cover that accepts a fabric based material. Unfortunately, this patent does not appear to disclose a cord cover that retracts in a similar manner to the disclosed invention nor does it possess similar attachment means to the electric cord as the disclosed invention.

U.S. Pat. No. 6,018,874 in the name of Todd discloses a sleeve with large radial dimensions that slides over a power cord. Unfortunately, this patent does not appear to disclose a fabric based decorative cord cover that is retractable nor does the disclosed patent appear to attach to the cord in the manner that the disclosed invention does.

U.S. Pat. No. 5,800,762 in the name of Bethel describes a heat shrinkable tubing to encase electrical cords. Unfortunately this patent does not appear to disclose a decorative fabric based cord cover that is retractable nor does the disclosed patent appear to connect to the cord in a manner similar to the disclosed invention.

U.S. Pat. No. 5,130,496 in the name of Jenkins discloses an electrical cord cover that opens along a longitudinal line to accept a length of cord. Unfortunately, this patent does not appear to disclose a retractable fabric based decorative cord cover that attaches to both ends of an electrical cord.

U.S. Pat. No. D 296,322 in the name of Collins describes a decorative covering for electrical cords that appears to be a conduit for an electrical cord or wiring. Unfortunately, this design patent does not appear to be similar in appearance to the disclosed invention nor does it appear to disclose a decorative retractable cord cover that attaches to an electrical cord.

None of the prior art particularly describes a decorative fabric based electrical cord cover that attaches to both ends of an electrical cord. Accordingly, there is a need for a retractable cord cover that retracts in efficient manner to prevent tangling with other electrical cords and the appearance of a cluttered area.

SUMMARY OF THE INVENTION

In view of the foregoing disadvantages inherent in the prior art, it has been observed that there is a need for a decorative electrical cord cover to provide a collapsing means to conventional electric cords affixed to small appliances to eliminate tangling of said electrical cords and a cluttered appearance.

It is an object of the retractable cord cover to provide a means for providing a collapsing means to conventional electrical appliances such as, but not limited to hair styling appliances, tools, computers, and the like.

Another object of the retractable cord cover is to secure an electrical cord at both ends to the device by weaving said electrical cord around lower fasteners in a zigzag pattern, thereby leaving a minimal amount of electric cord exposed at the plug and appliance ends.

A further object of the retractable cord cover is to provide a cord cover that extends with the electrical cord as the user extends the electrical cord and collapsibly retracts as the cord is retracted.

Still a further object of the retractable cord cover provides for a cover in the preferred embodiment of approximately ten (10) feet in length, however the decorative cord cover may be provided in various lengths to accommodate different lengths of electrical cords.

Yet another object of the retractable cord cover provides for a cover body provided in a variety of attractive colors and patterns based upon an existing decor and a user's preference.

An aspect of the retractable cord cover comprises a cover body, a plurality of first fasteners, and a seam. The cover body provides a collapsing textile enclosure thereto an electrical cord routed therein. The cover body comprises a rectangular textile fabric panel, being cup-shaped and joined along a long seam via a plurality of common fasteners forming a cylindrical or tubular shape approximately two (2) inches in diameter. The cover body provides a linear elastic function via a plurality of elastic elements affixed to an inner surface in a parallel arrangement.

A further aspect of the retractable cord cover comprises a plurality of first fasteners, a plurality of second fasteners, a seam, and a plurality of elastic elements. The cover body provides an attachment means along an overlapping or parallel seam to first and second fasteners being equally-spaced at approximately two (2) inches. An additional row of lower fasteners are located at proximal and distal end portions of the cover body being parallel to and beneath the row of first and second fasteners which provide an attachment means to the electrical cord.

Still another aspect of the decorative cord cover comprises lower fasteners around which the electrical cord is interwoven around so as to provide a friction means allowing extension of the device without slippage between the cord and the decorative retractable cord cover during repeated extending and collapsing cycles.

Yet a further aspect of the decorative retractable cord cover comprises a cover body that provides a linear elasticity means along a long axis via a plurality of elastic elements affixed to the inner surfaces. The elastic elements provide a rugged extruded cord preferably sewn thereto said cover body using conventional textile processes. The elastic elements are envisioned being made of materials having excellent elastic expansion ratios such as vulcanized natural rubber, latex, or the like. When a user allows the device to relax to the collapsed state, the elastic elements provide a tension force causing the device to take a form which is a fraction of its extended length.

The decorative retractable cord cover may be installed and utilized by performing the following steps: procuring a model of the device which provides a desired length which corresponds to an extended electrical cord length of an anticipated small appliance; extending the cover body out to full length by stretching the elastic element portions of the device along a flat surface such as a floor or table; laying an electrical cord thereupon; starting at one end of the device, weaving a portion of the electrical cord around the lower fasteners adjacent to the plug, thereby forming a zigzag pattern; snapping said lower fasteners, thereby securing the electrical cord to the cover body; snapping the first and second fasteners along the seam in a linear sequential manner until arriving at the appliance or proximal end of the device; weaving the electrical cord through the distal lower fasteners; snapping the lower fasteners closed in a similar zigzag fashion as the distal end, being previously described; allowing the device to collapse into a compact form being a fraction of its original length by releasing one (1) or both ends of the electrical cord; plugging the appliance into a normal electrical outlet; extending the device by extending the appliance from the plug portion; using the appliance to perform hair care or other tasks as needed; collapsing the device again by returning the appliance to a position adjacent to the plug; and, benefiting from reduced tangling, clutter, and tripping hazards associated with uncontrolled electrical cords, while using the decorative retractable cord cover.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
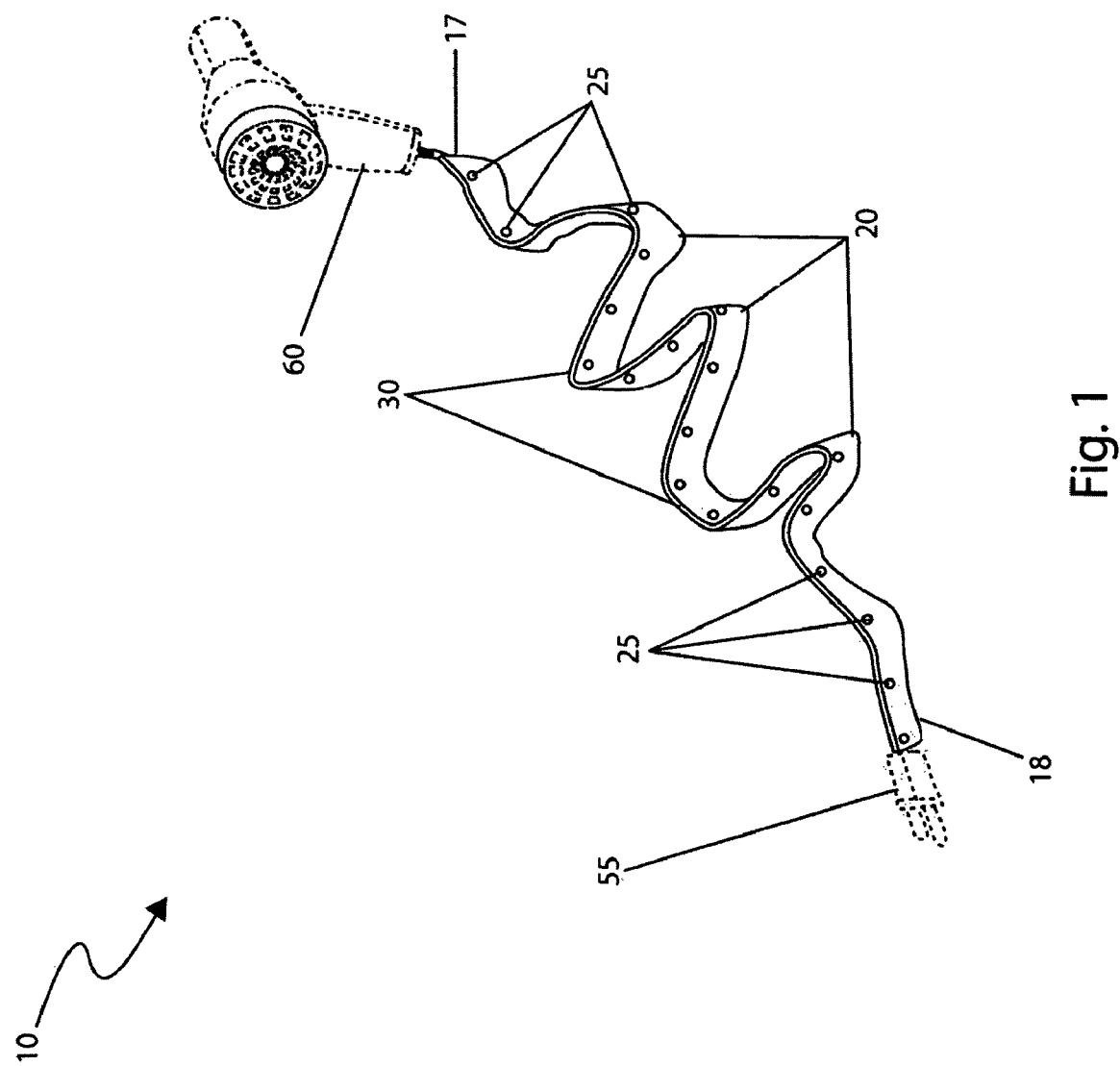
FIG. 1 is a perspective view of a decorative retractable cord cover 10 depicting a collapsed state, according to a preferred embodiment of the present invention.

DESCRIPTIVE KEY 10 decorative retractable cord cover
15 first side
16 second side
17 proximal end
18 distal end
20 cover body
25 first fastener
26 second fastener
27 first set lower fastener
28 second set lower fastener
30 long seam
35 elastic elements
50 electrical cord
55 plug
60 appliance

DETAILED DESCRIPTION OF THE PREFERRED EMBODIMENT

Figure 2:
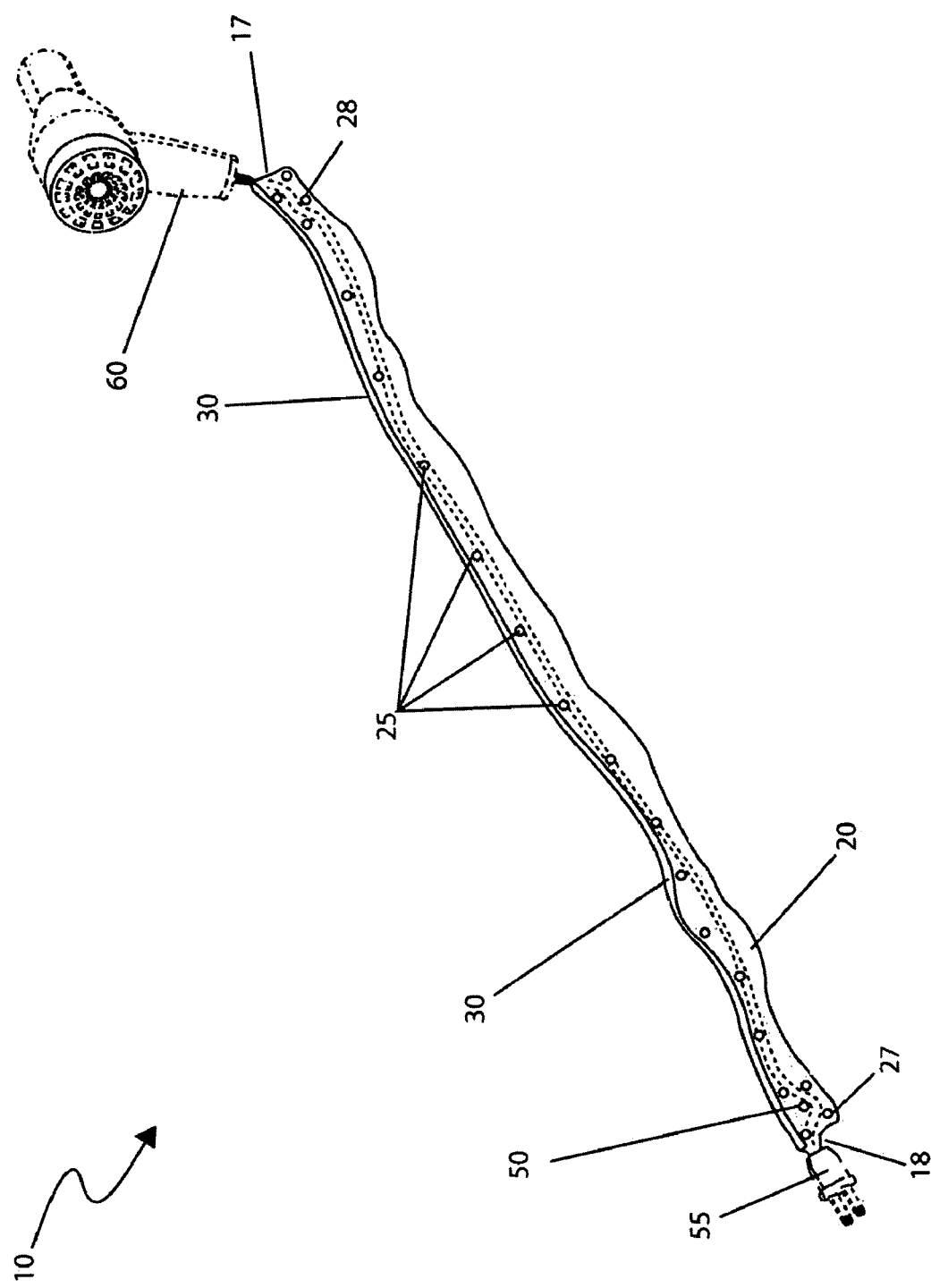
FIG. 2 is a perspective view of a decorative retractable cord cover 10 depicting an extended state, according to a preferred embodiment of the present invention; and, FIG. 3 is a close-up view of an electrical cord 50 attachment portion of a decorative retractable cord cover 10, according to a preferred embodiment of the present invention.
Figure 3:
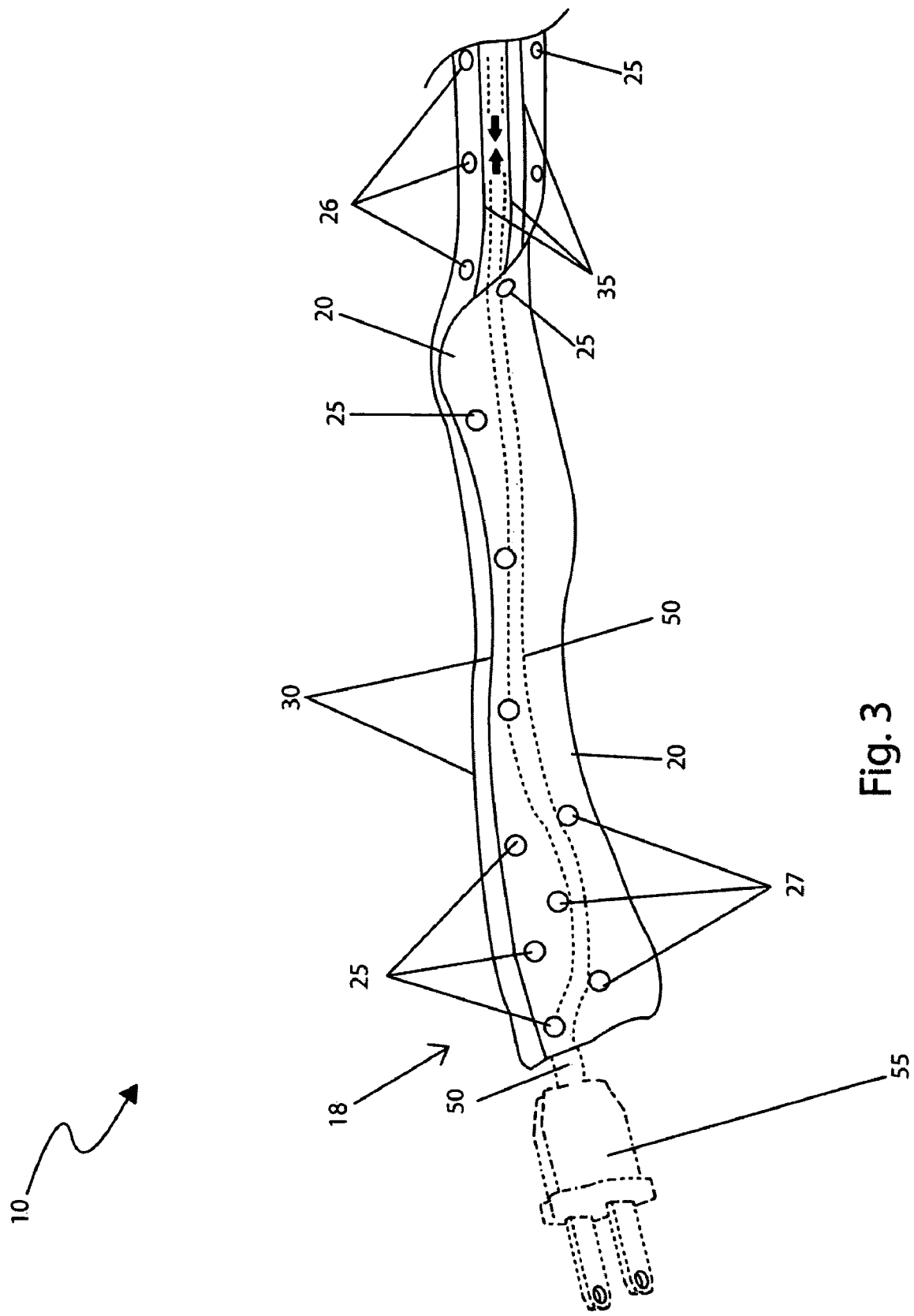

The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for a decorative retractable cord cover (herein described as the "device") 10, comprising a cylindrical textile cover for electrical cords with a plurality of embedded elastic strips 35 which provide a collapsing means thereto conventional electrical cords 50 affixed thereto hair care appliances or other types of small appliances 60 to eliminate tangling of said electrical cords 50. The device 10 may be utilized with hair styling appliances 60, tools, computers, or the like. The device 10 comprises a plurality of parallel elastic elements 35 which extend an entire length along an inner surface. The device 10 also comprises a single long seam 30 along a long axis being secured theretogether using a plurality of common snap-type fasteners 25. The electrical cord 50 is secured at both ends to the device 10 by weaving said electrical cord 50 around three (3) lower fasteners 27, 28 in a zigzag pattern, thereby leaving a minimal amount of electric cord 50 exposed at the plug 55 and appliance 60 ends thereof. Thus, as the user of the appliance 60 needs more electrical cord 50, one would pull on the electrical cord 50, thereby extending the device 10 in a linear manner. The maximum length of the device 10 is limited by the total length of the electrical cord 50. As the electrical cord 50 is relaxed, the device 10 retracts upon itself and thus shortens the length of the electrical cord 50.

Referring now to FIG. 1, a perspective view of the device 10 depicting a collapsed state, according to the preferred embodiment of the present invention, is disclosed. The device 10 comprises a cover body 20, a plurality of first fasteners 25, and a long seam 30. The cover body 20 provides a collapsing textile enclosure thereto an electrical cord 50 routed therein.

The cover body 20 comprises a rectangular textile fabric panel made using cotton, polyester, rayon, or the like, being cup-shaped and joined along a long seam 30 via a plurality of common fasteners 25 forming a cylindrical or tubular shape approximately two (2) inches in diameter. Furthermore, the cover body 20 is envisioned to be provided in a variety of attractive colors and patterns based upon an existing decor and a user's preference. During use, the device 10 may be allowed to collapse into a compact form as shown, thereby eliminating tangling and/or tripping hazards. The cover body 20 further provides a linear elastic function via a plurality of elastic elements 35 affixed thereto an inner surface in a parallel arrangement (see FIG. 3). For descriptive purposes, the end of the cord closest to the electrical plug shall be referred to as the distal end of the cord 18 and the remaining end of the cord closest to the electrical appliance shall be the proximal end of the cord 17.

Referring now to FIG. 2, a perspective view of the device 10 depicting an extended state, according to the preferred embodiment of the present invention, is disclosed. The device 10 is illustrated here fully extended providing a normal electrical cord length 50 to a user between the electrical plug portion 55 and the appliance 60. The length of the device 10 is envisioned to be approximately ten (10) feet long; however, the device 10 may be provided in various lengths so as to correspond thereto a specific electrical cord length 50 of one (1) or more anticipated appliances 60. A first set of three (3) lower fasteners 27 is located at the distal 18 end of the cord 55. A second set of three (3) lower fasteners is located at the proximal 17 end of the cord 55.

Referring now to FIG. 3, a close-up view of an electrical cord 50 attachment portion of the device 10, according to a preferred embodiment of the present invention, is disclosed. The device 10 comprises a plurality of first fasteners 25, a plurality of second fasteners 26, a seam 30, and a plurality of elastic elements 35. The cover body 20 provides an attachment means along an overlapping or parallel seam 30 thereto first 25 and second 26 fasteners being equally-spaced at approximately two (2) inches which comprise preferably, but not exclusively, of prong snap sockets and prong snap studs, respectively, being common in the industry. The cord cover comprises a first side 15 and a second side 16 wherein the first fasteners 25 are located upon the first side 15 of the cord cover and the second fasteners 26 are located on the second side 16 of the cord cover. The first fasteners 25 fit into the second fasteners 26 to maintain the cord cover thereupon the cord. It should be understood that the device 10 may be introduced providing other types of fastening means with equal benefit such as, but not limited to: hook-and-loop fasteners, buttons, or the like, and as such should not be interpreted as a limiting factor of the invention 10. A first set of three (3) lower fasteners is located at the distal 18 end of said cover body 20. A second set of three (3) lower fasteners is located at said proximal 17 end of the cover body 20. Said first and second set of lower fasteners 27, 28 are parallel to and beneath the row of first 25 and second 26 fasteners which provide an attachment means thereto the electrical cord 50 (plug 55 shown here). The electrical cord 50 is interwoven therearound the three (3) lower fasteners 27, 28 at both the proximal 17 and distal end 18 so as to provide a friction means allowing extension of the device 10 without propagating relative slippage therebetween said cord 50 and device 10 during repeated extending and collapsing cycles. In the preferred embodiment, three (3) lower fasteners 27 are located at the proximal end 17 of the cord cover and three (3) lower fasteners 27 are located at the distal end 18 of the cord cover. It should be understood that any number of lower fasteners 27 may be utilized and as such should not be considered a limiting feature of the invention. The first set of lower fasteners 27 and the second set of lower fasteners 28 are envisioned to be made using similar materials and construction as the aforementioned first 25 and second 26 fastener pairs. The cover body 20 further provides a linear elasticity means along a long axis via a plurality of elastic elements 35 affixed thereto along inner surfaces. The elastic elements 35 provide a rugged extruded cord preferably sewn thereto said cover body 20 using conventional textile processes and extending an entire length thereof; however, other types of bonding processes may be provided such as radio-frequency (RF) welding, ultrasonic welding, adhesives, or the like forming a strong permanent bond thereto the cover body 20. The elastic elements 35 are envisioned being made of materials having excellent elastic expansion ratios such as vulcanized natural rubber, latex, or the like. When a user allows the device 10 to relax to the collapsed state, the elastic elements 35 provide a tension force causing the device 10 to take a form which is a fraction of its extended length (see FIGS. 1 and 2).

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be utilized as indicated in FIGS. 1 and 2.

The method of utilizing the device 10 may be achieved by performing the following steps: procuring a model of the device 10 which provides a desired length which corresponds thereto an extended electrical cord length 50 of an anticipated small appliance 60; extending the cover body 20 out to full length by stretching the elastic element 35 portions of the device 10 along a flat surface such as a floor or table; laying an electrical cord 50 thereupon; starting at one end of the device 10, weaving a portion of the electrical cord 50 around the first set of three (3) lower fasteners 27 adjacent thereto the plug 55, thereby forming a zigzag pattern; snapping said lower fasteners 27, thereby securing the electrical cord 50 thereto the cover body 20; snapping the first 25 and second 26 fasteners along the seam 30 in a linear sequential manner until arriving at the appliance 60 or proximal end of the device 10; weaving the electrical cord 50 therethrough the distal lower fasteners 27; snapping the lower fasteners 27 in a similar zigzag fashion as the distal 18 end, being previously described; allowing the device 10 to collapse into a compact form being a fraction of its original length by releasing one (1) or both ends of the electrical cord 50; plugging the appliance 60 into a normal electrical outlet; extending the device 10 by extending the appliance 60 therefrom the plug portion 55; using the appliance 60 to perform hair care or other tasks as needed; collapsing the device 10 again by returning the appliance 60 thereto a position adjacent to the plug 55; and, benefiting from reduced tangling, clutter, and tripping hazards associated with uncontrolled electrical cords 50, while using the present invention 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A retractable cord cover comprising:
   a rectangular cover body comprising a bifurcated long seam, a proximal end, and a distal end;
   a plurality of first fasteners positioned along a first side of said long seam of said cover body;
   a plurality of second fasteners positioned along a second side of said long seam of said cover body;
   a first set of a plurality of lower fasteners located at said distal end of said cover body;
   a second set of a plurality of second lower fasteners located at said proximal end of said cover body; and,
   a plurality of elastic elements affixed thereto an inner surface of said cover body and extending therefrom said proximal thereto said distal end;
   wherein said first side is joined thereto said second side along said long seam by mating said plurality of first fasteners thereto said plurality of second fasteners to form a generally tubular shape; and,
   wherein said first set and second set of plurality of lower fasteners are parallel and subjacent thereto said plurality of said first and second fasteners.

2. The retractable cord cover of claim 1, wherein said plurality of first and second fasteners are each equidistantly spaced at approximately two (2) inch intervals.

3. The retractable cord cover of claim 2, wherein said plurality of elastic elements are each affixed thereto inner surfaces of said cover body in a parallel arrangement.

4. The retractable cord cover of claim 3, wherein said plurality of elastic elements are each sewn thereto said cover body.

5. The retractable cord cover of claim 4, wherein said cover body comprises a variety of attractive colors and patterns to coordinate therewith an existing decor.

6. The retractable cord cover of claim 5, wherein said cord cover comprises various lengths so as to correspond to a specific electrical cord length of at least one (1) small appliance.

7. The retractable cord cover of claim 6, wherein said cover body comprises one of the following material of construction: cotton, polyester, or rayon.

8. The retractable cord cover of claim 7, wherein said plurality of first and second fasteners each comprise at least one of the following: snap-type fasteners, hook-and-loop fasteners, or buttons.

9. The retractable cord cover of claim 1, further comprising a diameter of approximately two (2) inches.

10. The retractable cord cover of claim 1, wherein said retractable cord cover is approximately ten (10) feet in length.

11. The retractable cord cover of claim 1, wherein said plurality of lower fasteners comprises three (3) in number.

12. A retractable cord cover comprising:
   a rectangular cover body comprising a bifurcated long seam, a proximal end, and a distal end;
   a plurality of first fasteners positioned along a first side of said long seam of said cover body;
   a plurality of second fasteners positioned along a second side of said long seam of said cover body;
   a first set of three (3) lower fasteners located at said distal end of said cover body;
   a second set of three (3) lower fasteners located at said proximal end of said cover body; and,
   a plurality of elastic elements affixed thereto an inner surface of said cover body and extending therefrom said proximal thereto said distal end;
   wherein said first side is joined thereto said second side along said long seam by mating said plurality of first fasteners thereto said plurality of second fasteners to form a generally tubular shape;
   wherein said first set and second set of plurality of lower fasteners are parallel and subjacent thereto said plurality of said first and second fasteners; and,
   wherein said plurality of elastic elements are affixed thereto inner surfaces of said cover body in a parallel arrangement.

13. The retractable cord cover of claim 12, wherein said plurality of first and second fasteners are each equidistantly spaced at approximately two (2) inch intervals.

14. The retractable cord cover of claim 13, wherein said cover body comprises a variety of attractive colors and patterns to coordinate therewith an existing decor.

15. The retractable cord cover of claim 14, wherein said cord cover comprises various lengths so as to correspond to a specific electrical cord length of at least one (1) small appliance.

16. The retractable cord cover of claim 15 wherein said cover body comprises one of the following material of construction: cotton, polyester, or rayon.

17. The retractable cord cover of claim 14 wherein said plurality of first and second fasteners each comprise at least one of the following: snap-type fasteners, hook-and-loop fasteners, or buttons.

18. The retractable cord cover of claim 17, further comprising a diameter of approximately two (2) inches and a length of approximately ten (10) feet.

19. A method of installing and utilizing a retractable cord cover to decoratively and discretely cover an electrical cord of an appliance by performing the following steps:
   providing a retractable cord cover further comprising:
      a rectangular cover body comprising a bifurcated long seam, a proximal end, and a distal end;
      a plurality of first fasteners positioned along a first side of said long seam of said cover body;
      a plurality of second fasteners positioned along a second side of said long seam of said cover body;
      a first set of three (3) lower fasteners located at said distal end of said cover body;
      a second set of three (3) lower fasteners located at said proximal end of said cover body; and,
      a plurality of elastic elements affixed thereto an inner surface of said cover body and extending therefrom said proximal thereto said distal end;
      wherein said first side is joined thereto said second side along said long seam by mating said plurality of first fasteners thereto said plurality of second fasteners to form a generally tubular shape;
      wherein said first set and second set of plurality of lower fasteners are parallel and subjacent thereto said plurality of said first and second fasteners; and,
      wherein said plurality of elastic elements are affixed thereto inner surfaces of said cover body in a parallel arrangement;
   extending said cover body out to a full length by stretching said plurality of elastic elements of said cover body along a flat surface;
   laying said electrical cord thereupon said cover body;
   starting at said proximal end of said cover body, weaving a portion of said electrical cord around said first set of lower fasteners adjacent thereto a plug of said electrical cord, thereby forming a zigzag pattern;

mating and closing said first set of lower fasteners;

aligning and mating said plurality first fasteners therewith corresponding said plurality of second fasteners along said long seam in a linear configuration, thereby creating said generally tubular shape;

weaving said distal end of said electrical cord around said second set of lower fasteners adjacent thereto said appliance, thereby forming a zigzag pattern;

mating and closing said second set of lower fasteners;

plugging said plug into an electrical outlet;

allowing said cord cover to retract into a compact form by releasing one (1) or both ends of said electrical cord;

extending said appliance with said retractable cord cover as needed by extending said cord;

using said appliance in a normal and expected manner;

collapsing said cord cover again by returning said appliance to a position adjacent to said, plug; and, benefiting from elimination or reduction of hazards such as tangling, clutter, and tripping utilizing said retractable cord cover.

\* \* \* \* \*